United States Patent
Thompson

(10) Patent No.: US 6,645,410 B2
(45) Date of Patent: Nov. 11, 2003

(54) MANUFACTURING APPARATUS AND METHOD FOR MULTIPLE CONTAINMENT TUBING

(75) Inventor: Bruce W. Thompson, Waconia, MN (US)

(73) Assignee: Entegris, Inc., Chaska, MN (US)

( * ) Notice: Subject to any disclaimer, the term of this patent is extended or adjusted under 35 U.S.C. 154(b) by 0 days.

(21) Appl. No.: 10/150,684

(22) Filed: May 17, 2002

(65) Prior Publication Data

US 2002/0179232 A1 Dec. 5, 2002

Related U.S. Application Data

(60) Provisional application No. 60/291,576, filed on May 17, 2001.

(51) Int. Cl.[7] .......................... B29C 47/06; B29C 47/90
(52) U.S. Cl. ........................... 264/171.13; 264/171.26; 264/209.4; 425/71; 425/113; 425/114; 425/326.1; 425/377
(58) Field of Search .......................... 425/71, 113, 114, 425/326.1, 377, 378.1, 388; 264/568, 171.13, 171.26, 209.4

(56) References Cited

U.S. PATENT DOCUMENTS

| | | |
|---|---|---|
| 3,211,818 A | 10/1965 | Beckwith |
| 4,157,194 A | 6/1979 | Takahashi |
| 4,236,953 A | 12/1980 | Takahashi |
| 4,575,326 A | 3/1986 | French |
| 4,906,496 A | 3/1990 | Hosono et al. |
| 5,318,432 A | 6/1994 | Yagi et al. |
| 5,433,252 A | 7/1995 | Wolf et al. |
| 5,471,553 A * | 11/1995 | Teshima ............... 385/125 |
| 5,587,181 A | 12/1996 | Owens et al. |
| 5,976,298 A | 11/1999 | Hegler et al. |

FOREIGN PATENT DOCUMENTS

EP     0494566 A1     7/1992

OTHER PUBLICATIONS

International Search Report PCT/US02/15853.

* cited by examiner

Primary Examiner—James P. Mackey
Assistant Examiner—Joseph Leyson
(74) Attorney, Agent, or Firm—Patterson, Thuente, Skaar & Christensen, P.A.

(57) ABSTRACT

A manufacturing apparatus and method for multiple containment tubing produces continuous, nested tubing, or one tube within another tube, without having to fix the space between the tubes or position them concentrically. Consequently the tubing is very flexible and with uniform wall thickness. Moreover, because the inner surface of the outer tube and the outer surface of the inner tube are ribless, these kinds of features cannot interfere with the bending and twisting and the operation of the tubes comprising the tubing. The space between the tubes, or free space, has sufficient volume to contain a range of contents of the inner tube, as a safety containment device, if the inner tube ruptures, cracks, or otherwise breaks.

12 Claims, 3 Drawing Sheets

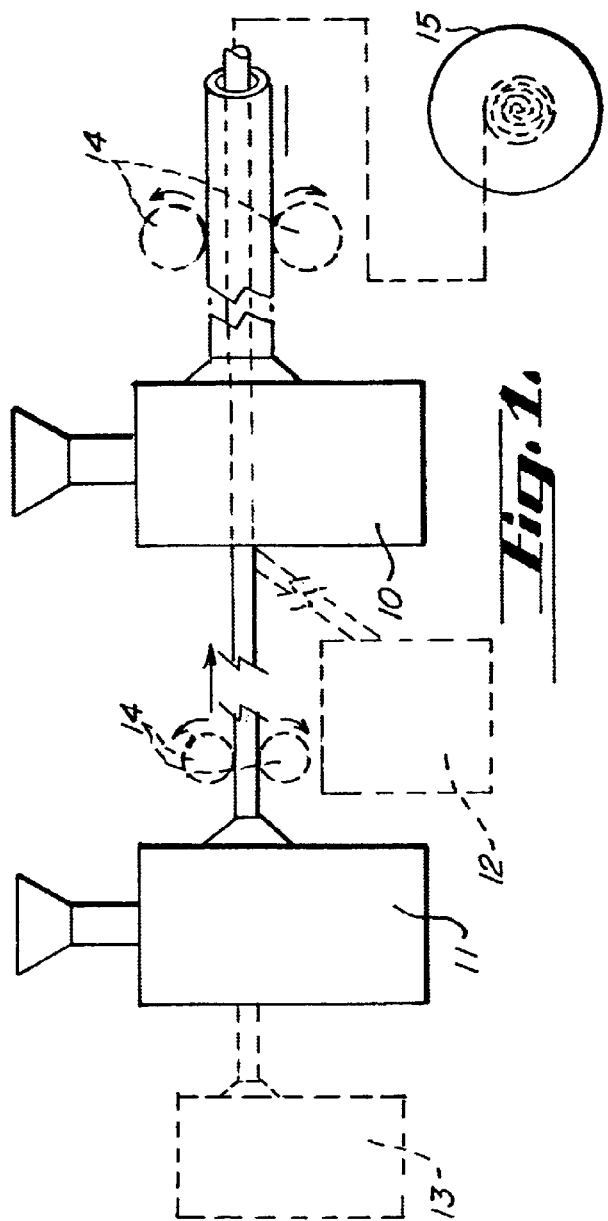
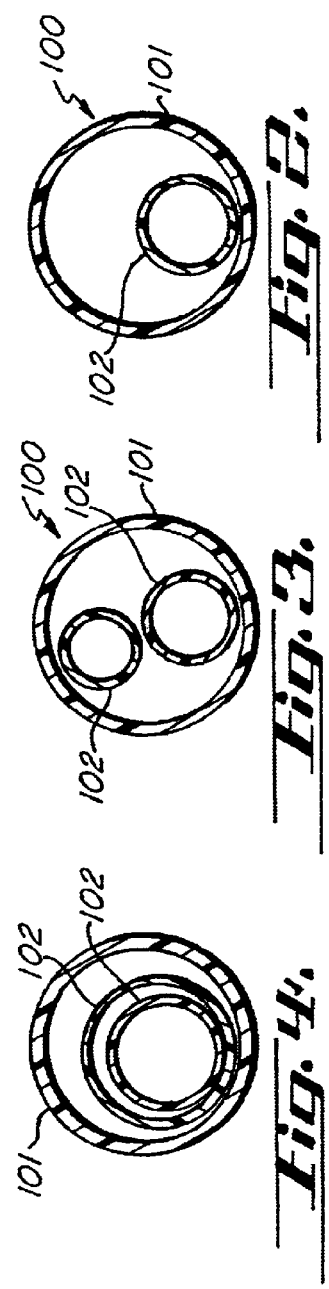

MANUFACTURING APPARATUS AND METHOD FOR MULTIPLE CONTAINMENT TUBING

RELATED APPLICATIONS

This application claims the benefit of U.S. Provisional Application No. 60/291,576, filed on May 17, 2001, which is hereby incorporated herein by reference.

FIELD OF THE INVENTION

The present invention relates generally to the area of tubular members of definite or indefinite length, including the wall structure of the tubular members. In particular, the present invention relates to manufacturing multi-layer tubing or pipe made from a thermoplastic material, which tubing or pipe comprises at least one inner tube or pipe that is internally positioned or situated within and separate from an outer tube or pipe.

BACKGROUND OF THE INVENTION

In industries such as the semiconductor or chip processing industry where several kinds of dangerous chemicals are being used at several processing and manufacturing stages, it is important to have tubing and/or pipes to transport these chemicals and that is non-reactive with the chemicals, flexible enough to bend between connections, and provide containment in the event that the immediate tube transporting the chemical ruptures or otherwise breaks. Various materials to make these tubes and pipes are known to those skilled in the art, such as thermoplastic tubing. In this Application, unless the context indicates otherwise, the terms "tubing" and "tube" likewise refer to "piping" and "pipe".

Common practice to produce thermoplastic tubing uses a plasticating extruder with an annular die to form a hollow tube that is pulled into a sizing device for sizing and shaping and where the thermoplastic solidifies into finished tubing. Nested tubing can be made or manufactured by various mechanical methods. Tubing having a smaller outer diameter than the inner diameter of other tubing can be manually pushed or pulled inside the other tubing. The process may be assisted by a machine. This process is generally limited to finished product lengths, however, because frictional forces cause the tubes to bind as one tube traverses the other. Lubricants can be used in some circumstances to reduce the effects of these frictional forces, but frictional forces eventually come into play again and, in many circumstance, it is undesirable to introduce the lubricant into the tubing.

Alternatively some tubing extrusion processes can produce nested tubing by producing one tube over the top of another tube. These extrusion processes rely on parts designs and/or bonding one tube to another to make multi-walled hollow tubes having rigidly interconnected walls or to hold one tube concentrically in the other tube. Examples of multi-walled hollow tubes having rigidly interconnected walls are disclosed in Hosono et al., U.S. Pat. No. 4,906,496, Double-Walled Tube Assembly and Hegler et al., U.S. Pat. No. 5,976,298, Method of Producing Multilayer Thermoplastic Pipe, both of which are incorporated herein by reference. Hosono discloses "feeding the inner tube and the extruded outer tube into a sizing die device, contracting the outer tube in a softened state toward the outer peripheral surface of the inner tube in the sizing die device until the distal ends of the ribs of the outer tube are fused to the outer peripheral surface of the inner tube, and cooling and solidifying the outer tube. Hegler discloses "heating to welding temperature at least the outer surfaces of the externally profiled shape . . . and extruding a tube of plastic material on to the outer surfaces of the pipe of externally profiled shape . . . and welding together the tube and outer surfaces. and cooling the multilayer pipe". Rigid tubing suffers from an inability to easily bend the tubing without creating stress cracks in the tubing.

A bonding process is exemplified by Takahashi, U.S. Pat. No. 4,157,194, Thermoplastic Multi-Walled Pipes and Takahashi, U.S. Pat. No. 4,236,953, Process for Producing Thermoplastic Multi-Walled Pipes, both of which are also incorporated herein by reference. To avoid the disadvantages of rigidly fixed multi-walled pipe or tubing, Takahashi uses "ribs for spacing the inner and outer tubular members". The "rib . . . is so formed that the bond per unit area between the rib . . . and inner tubular member is weaker than the bond per unit area between the rib . . . and outer tubular member" so that "[i]f the weak-bond temperature is properly selected at a temperature between the forming temperature and the melting temperature of resin depending upon the kinds of resin used, the inner and outer tubular members may be easily separated from each other, and the structural strength of the multi-walled pipe will not be impaired". Although these tubings are more flexible, especially when "breakaway" bonds are used, there is still some stress caused by the bonding and the ribs or spaces can interfere with the bending and twisting and the operation of the tube.

Another alternative is disclosed in Wolf et al., U.S. Pat. No. 5,433,252, Fluid Containing Coaxial Tube for Control Systems, also incorporated herein by reference. Wolf discloses a coaxial tube comprising a "fluid-tight outer tube and a fluid-tight inner tube with spacers between the tubes . . . [to] maintain the inner tube at least substantially coaxial with the outer tube" wherein "the spacer is integral only with the outer tube or the inner tube [so] that the inner tube and the outer tube are able in a limited way to freely axially shift relative to each other". To manufacture the coaxial tube, "first the inner tube is manufactured separately, preferably by extrusion, and then it is cooled". The outer tube is "shaped in a second extrusion station in the direction of extrusion around the inner tube, and in particular this will be done using the technique of coaxial sheath extrusion". The inner tube "will be already sufficiently cold and solid. so that, during the ensuing molding of the outer tube around the inner tube, neither the wall thickness of the inside tube will be lessened or changed, nor is the outer tube able to bond to the inner tube". The tubing in Wolf can be very flexible; however, the problem that the ribs and spacers can interfere with the bending and twisting and the operation of the tubing still exists.

It would be advantageous if an apparatus and method for manufacturing multiply contained tubing could be developed that produced both tubing that was very flexible and was ribless, i.e., the inner surface of the outer tube and the outer surface of the inner tube could be produced without ribs, spacers, or like structural features.

SUMMARY OF THE INVENTION

The present invention provides a manufacturing apparatus and method for multiple containment tubing. The apparatus produces continuous or virtually endless, nested tubing, or one tube within another tube, without having to fix the space between the tubes or position them concentrically. Consequently the tubing is very flexible and with uniform wall thickness. Moreover, because the inner surface of the outer tube and the outer surface of the inner tube are ribless, these kinds of features cannot interfere with the bending and twisting and the operation of the tubes comprising the tubing. The space between the tubes, or free space, has sufficient volume to contain a range of contents of the inner tube, as a safety containment device, if the inner tube ruptures, cracks, or otherwise breaks. In particular, resins of PFA, FEP, Olefin such as HDPE or PP materials, or other fluorinated hydrocarbons or similar materials that have chemical resistance suitable for the electronics industry or combinations of these resins are applicable to this invention.

In preferred embodiments, the apparatus comprises an outer tube extruder, an outer tube sizing device, and a hollow annular guide. The outer tube extruder includes an extruder body, a mandrel, and a die body. The mandrel and the die body have a longitudinal direction and are approximately longitudinally aligned, and the die body circumscribes the mandrel. The mandrel and the die body are connected to the extruder body so that a melt pool can be forced through the extruder body, into a cavity between the die body and the mandrel, and out from between the die body and the mandrel in the form of and to create an outer tube. A bore passes through the mandrel longitudinally and possibly through the extruder body to provide a passage for the at least one inner tube through the outer tube extruder. The outer tube sizing device also has a bore. This sizing device bore receives the outer tube form to size and shape the outer tube. An important feature of the apparatus is the annular guide. The annular guide extends at least from the outer tube extruder bore into the sizing device bore so that the at least one inner tube passes through the annular guide and the outer tube passes over or around or surrounding the annular guide. The annular guide has a wall having a distal end and a duct opening on the distal end. A duct at least passes through the wall of the annular guide to the duct opening, through which a cooling agent can pass to be applied to the inner surface of the outer tube. By cooling the inner surface of the outer tube as the outer tube leaves the annular guide, the outer tube loses its tackiness and is unlikely to bond with the at least one inner tube.

Once a preferred embodiment of the apparatus is operational, the at least one inner tube is passed through the outer tube extruder bore and annular guide, and then through the sizing device bore. A melt pool is forced through the extruder body into the cavity between the die body and mandrel and from between the die body and mandrel in the form of and to create an outer tube. The outer tube is pulled through the sizing device bore to shape it and size it. The outer tube is also cooled during shaping and sizing, using conventional means on the exterior surface of the outer tube and cooling agents applied from the annular guide opening to the interior surface of the outer tube, so that the outer tube maintains its form and to prevent it from bonding to the at least one inner tube.

BRIEF DESCRIPTION OF THE DRAWINGS

FIG. 1 is a diagram of a series of interconnected multiple containment tubing manufacturing apparatuses for making various arrangements of continuous, nested tubing.

FIG. 2 is a cross-sectional view of a basic arrangement of nested tubing.

FIG. 3 is a cross-sectional view of an alternative arrangement of nested tubing.

FIG. 4 is a cross-sectional view of an alternative arrangement of nested tubing.

DESCRIPTION OF THE PREFERRED EMBODIMENT

Figure 5:
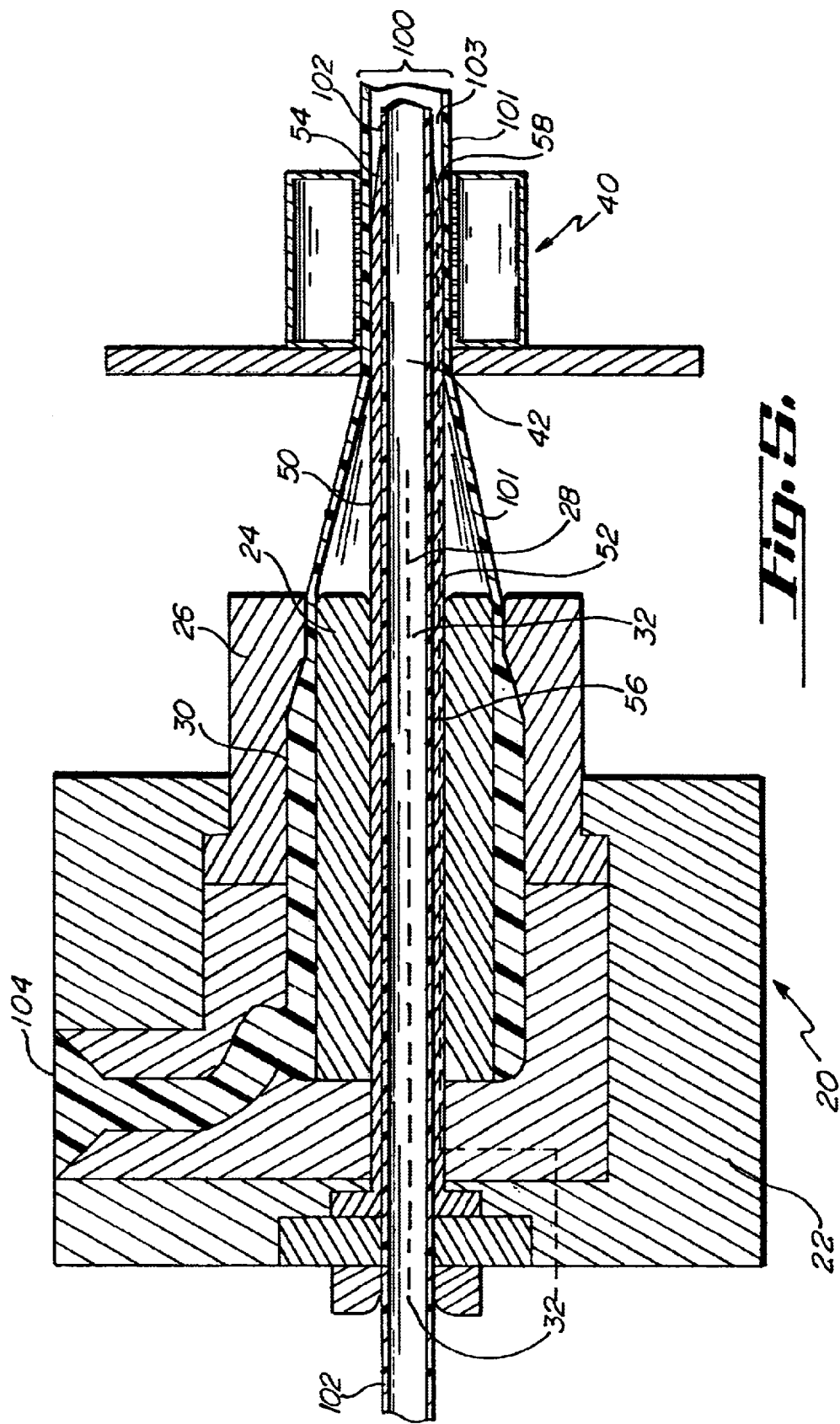
FIG. 5 is a cross sectional view of a multiple containment tubing manufacturing apparatus.

The preferred embodiment relates to a manufacturing apparatus and method for multiple containment tubing in accordance with the present invention. A unit apparatus is capable of making continuous, nested tubing 100 including an outer tube 101 and at least one inner tube 102, as illustrated in the cross-sectional view in FIG. 2. Those skilled in the art are aware that there are several means for making individual tubes that can be used as inner tubes, which means can be used in advance of making the nested tubing 100 or immediately beforehand. As shown in FIG. 1, to create tubing having a plurality of inner tubes 102, a plurality of inner tubes 102 are passed from apparatuses 11 and 12 into and through an apparatus 10 so that an outer tube 101 is formed around the group of inner tubes 102. A cross-sectional view of such tubing is illustrated in FIG. 3. To create multiply-nested tubing, a series of apparatuses 10, 11, and 13 are interconnected. A cross-sectional view of this kind of tubing is illustrated in FIG. 4. These two techniques can be used in combination to make a myriad of tubing arrangements. Pullers 14 are used to pull the tubes at speeds appropriate for the resin being used to form the tubes, and a coiler 15 may coil the nested tubing 100.

The preferred embodiment of the apparatus, a cross-section of which is shown in FIG. 5, is comprised of an outer tube extruder 20, an outer tube sizing device 40, and a hollow annular guide 50. The outer tube extruder 20 has an extruder body 22, a mandrel 24, and a die body 26, which preferably may be individually formed parts but may also be regions of an integrally formed outer tube extruder 20. The mandrel 24 and the die body 26 each have a longitudinal direction 28. The extruder body 22 has a recess for longitudinally inserting and connecting the mandrel 24 and the die body 26 to the extruder body 22. As those in the art are aware, there are several ways of connecting the mandrel 24 and die body 26 to the extruder body 22 so that thermoplastic melt can be forced between and from between the mandrel 24 and die body 26. The mandrel 24 is a cylinder and the die body 26 is a hollow cylinder or sleeve that circumscribes the mandrel 24 when the mandrel 24 and the die body 26 are properly connected to the extruder body 22. When the outer tube extruder 20 is properly assembled, a cavity 30 is formed that passes through the extruder body 22 and along the outer surface of the mandrel and inner surface of the die body to extrude thermoplastic melt in the form of and to create the outer tube 101 to the desired size and shape. The thermoplastic melt enters the cavity 30 and wraps around the outer surface of the mandrel 24 to form a continuous melt pool 104 of molten thermoplastic resin. Pressure from the extruder melt flow causes the molten thermoplastic resin to rejoin and form a continuous cylindrical tube that is drawn between the die body 26 and the mandrel 24. As it exits the outer tube extruder 20, a hollow cone of molten thermoplastic resin is formed and pulled into and through a sizing device bore 42 of the outer tube sizing device 40 to size and shape the outer tube 101. The length of the sizing device 40 is very specific to the resin used, the temperature of the resin, the line speed, and the cooling capacity of the sizing device 40. The length of the sizing device 40 is generally less than 25 diameters of the outer tube 101.

An outer tube extruder bore 32 passes through the mandrel 24 longitudinally and possibly the extruder body 22 so that concurrently with extruding a continuous outer tube 101, and moving at the same speed at which the outer tube is pulled of generally between 10 to 300 inches per minute, depending upon the material, at least one inner tube 102 passes through the outer tube extruder 20 and is nested inside the outer tube 101. The at least one inner tube 102 may be made in advance of making the outer tube 101 or proximately prior to making the outer tube 101.

The hollow annular guide 50 of the preferred embodiment is a hollow cylinder that extends at least from the outer tube extruder bore 32 into the sizing device bore 42. Preferably, the annular guide 50 snuggly fits into and extends the entire length of the outer tube extruder bore 32. The annular guide 50 is open on both ends of the cylinder and has a wall 52 with a distal end 54, and a duct opening 58 on the distal end 54. The hollow is sufficiently large to allow the at least one inner tube 102 to effortlessly pass through the annular guide 50. The annular guide 50 extends a length of approximately 5 diameters to 35 diameters past the outer tube extruder 20 and keeps the outer tube 101 separated from the at least one inner tube 102 until the outer tube 101 has been sized and shaped and cooled to the extend that it cannot bond with the at least one inner tube 102 if the tubes happen to come into contact with each other past the distal end 54 of the annular guide 50.

Cooling the outer surface of the outer tube 101 is accomplished by maintaining a reduced atmospheric pressure of about 0–25 inches of mercury in the sizing device bore 42 and using a cooling agent (not shown) such as a water bath, water vapor, water-gas mixture, or any combination thereof to quench the size and shape of the outer tube 101. Commercially available cooling tanks with vacuum devices capable of pulling a vacuum of about 0 to 25 inches of mercury can be used to remove heat from the outer tube 101. The sizing device bore 42 is open to the vacuum source (not shown), which can be used to pull the outer tube 101 up against the surface of the sizing device bore 42. To accelerate cooling the interior surface of the outer tube 101, a cooling agent (not shown) is communicated through a duct 56 connected to the duct opening 58 and out the duct opening 58 onto this interior surface. This cooling agent may be any of several non-reactive agents known to those skilled in the art, such as a stream of air, a stream of inert gas, a stream of filtered water, a stream of de-ionized water, a water mist, water vapor, or any combination thereof. The cooling agent preferably is applied under pressure sufficient to maintain the desired separation or free space between the outer tube and the at least one inner tube.

Figure 6:
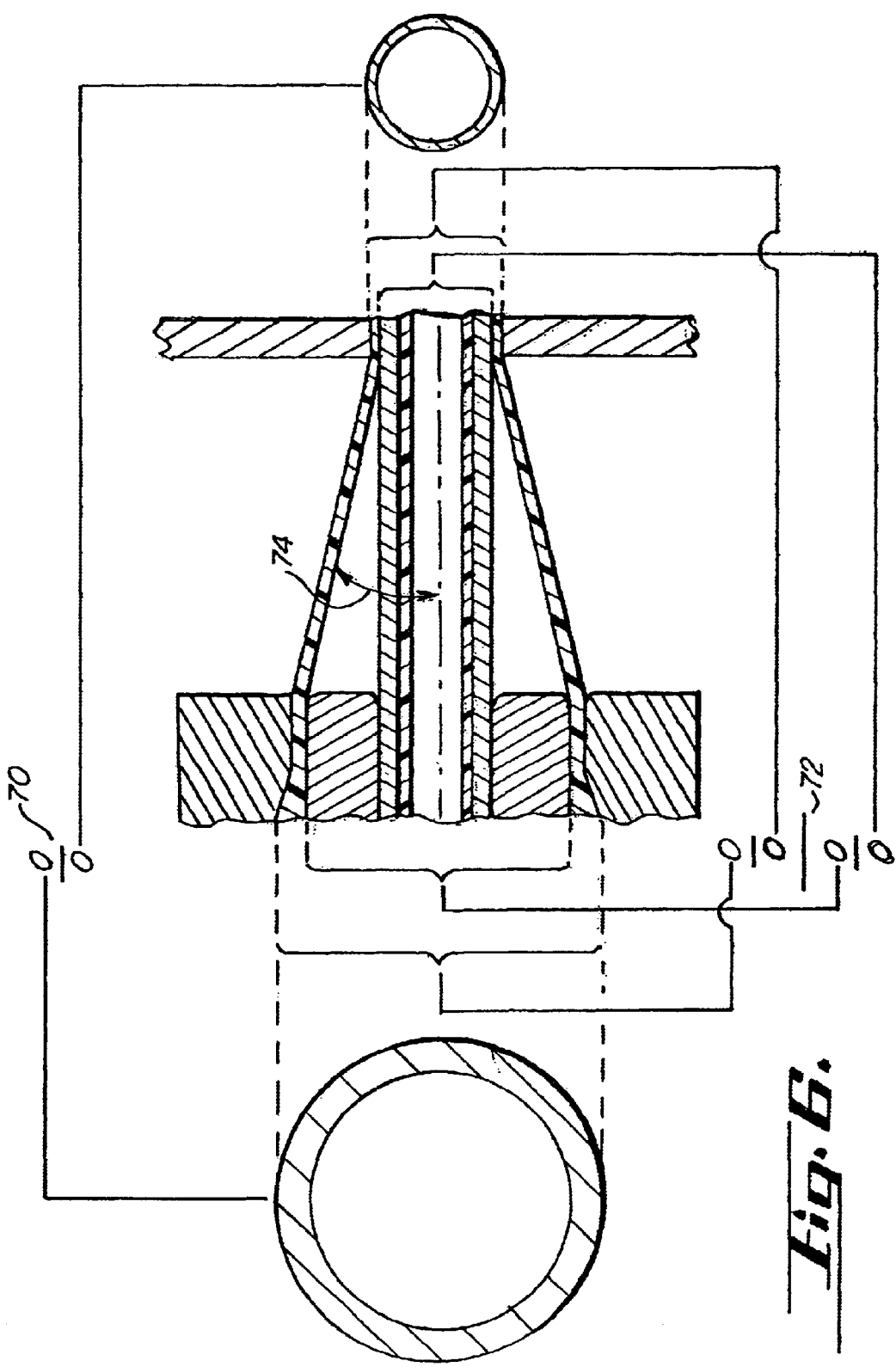
FIG. 6 is an enlarged cross-sectional view of a multiple containment tubing apparatus between the outer tube extruder and the outer tube sizing device.

The draw down ratio and the draw ratio balance to make the nested tubing are very important. As illustrated in FIG. 6, the draw down ratio 70 is defined as the ratio of cross-sectional area of the die opening to the cross-sectional area of the finished outer tubing and should be in the range of approximately 5 to 10. The draw ratio balance 72 is the quotient of the ratios of die opening to outside dimension of outer tube, and the ratio of outside dimension of the pin or mandrel to the tubing opening and should be in the range of 0 to 2. Temperature of the die, extruder, annular guide, and sizing device should be kept according to manufacturers' recommendations for the particular resin. The incident angle of convergence or divergence 74 of the die and pin or mandrel 24 is in the range of approximately −30 degrees of difference to approximately +30 degrees of difference. In other words, the die and pin or mandrel 24 can converge, be parallel, or diverge with respect to the centerline of the tubing. The resin choice and processing conditions are very dependent on the die design.

In operation, the at least one inner tube is passed through the outer tube extruder bore and annular guide, and then through the sizing device bore. A melt pool is forced through the extruder body into the cavity between the die body and mandrel and from between the die body and mandrel in the form of and to create an outer tube. The outer tube is pulled by pullers through the sizing device bore to shape it and size it, after which the tubing is coiled. The outer tube is also cooled during shaping and sizing, using conventional means on the exterior surface of the outer tube and cooling agents applied from the annular guide opening to the interior surface of the outer tube, so that the outer tube maintains its form and to prevent it from bonding to the at least one inner tube. If the at least one inner tube is not formed and sized and shaped immediately before the outer tube, pullers may also be provided to pull the at least one inner tube into the outer tube extruder.

Although a preferred embodiment of the manufacturing apparatus and method for multiple containment tubing has been described herein, numerous changes and variations can be made and the scope of the present invention is intended to be defined by the claims herein.

That which is claimed:

1. An apparatus for making continuous, nested tubing including an outer tube and at least one inner tube, and having free space between the outer tube and the at least one inner tube, comprising:

an outer tube extruder including an extruder body, a mandrel, and a die body, the mandrel and the die body each having a longitudinal direction, wherein the die body and the mandrel are approximately longitudinally aligned and the die body circumscribes the mandrel, wherein the mandrel and the die body are connected to the extruder body, wherein an outer tube extruder bore at least passes through the mandrel longitudinally to provide a passage for the at least one inner tube through the outer tube extruder, and wherein the die body and the mandrel form a cavity into which a melt pool is forced through to create a ribless outer tube surrounding the at least one inner tube;

an outer tube sizing device having a sizing device bore therethrough to receive and size and shape the outer tube; and a hollow annular guide having a wall with a distal end and a duct opening on the distal end, the annular guide extending at least from the outer tube extruder bore into the sizing device bore, wherein the at least one inner tube passes through the annular guide and the outer tube surrounds the annular guide, and wherein a duct at least passes through the wall of the annular guide to the duct opening to apply a cooling agent to the outer tube.

2. The apparatus of claim 1, wherein the cooling agent is selected from cooling agents consisting of a stream of air, a stream of inert gas, a stream of filtered water, a stream of de-ionized water, a water mist, water vapor, and any combination thereof.

3. The apparatus of claim 1, wherein the cooling agent is applied to the outer tube at a pressure sufficient to keep the outer tube and the at least one inner tube separated until the outer tube has cooled.

4. The apparatus of claim 1, wherein the apparatus has a draw down ratio in the range of approximately 5 to 10.

5. The apparatus of claim 1, wherein the apparatus has a draw ratio balance in the range of approximately 0 to 2.

6. The apparatus of claim 1, wherein the apparatus has an incident angle of convergence or divergence in the range of approximately −30 degrees of difference to +30 degrees of difference.

7. The apparatus of claim 1, wherein the annular guide has a length beyond the outer tube extruder in the range of approximately 5 and 35 diameters of an outer tube made from predetermined resins.

8. The apparatus of claim 1, wherein a plurality of apparatuses are connected in series to create multiply nested tubing.

9. An apparatus for making continuous, nested tubing including an outer tube and at least one inner tube, and having free space between the outer tube and the at least one inner tube, comprising:

an outer tube extruder including an extruder body, a mandrel, and a die body, the mandrel and the die body each having a longitudinal direction, wherein the die body and the mandrel are approximately longitudinally aligned and the die body circumscribes the mandrel, wherein the mandrel and the die body are connected to the extruder body, wherein an outer tube extruder bore at least passes through the mandrel longitudinally to provide a passage for the at least one inner tube through the outer tube extruder, and wherein the die body and the mandrel form a cavity into which a melt pool is forced through to create an outer tube surrounding the at least one inner tube;

an outer tube sizing device having a sizing device bore therethrough to receive and size and shape the outer tube; and a hollow annular guide having a wall with a distal end and a duct opening on the distal end, the annular guide extending at least from the outer tube extruder bore into the sizing device bore, wherein the at least one inner tube passes through the annular guide and the outer tube surrounds the annular guide, and wherein a duct at least passes through the wall of the annular guide to the duct opening to apply a cooling agent to the outer tube.

10. A method for making continuous, nested tubing including an outer tube and at least one inner tube, and having free space between the outer tube and each inner tube, comprising:

(a) providing an outer tube extruder including an extruder body, a mandrel, and a die body, the mandrel and the die body each having a longitudinal direction, and wherein an outer tube extruder bore at least passes through the mandrel longitudinally to provide a passage for the at least one inner tube through the outer tube extruder;

(b) providing an outer tube sizing device having a sizing device bore therethrough;

(c) providing a hollow annular guide having a wall with a distal end and a duct opening on the distal end, the annular guide extending at least from the outer tube extruder bore into the sizing device bore;

(d) providing a duct at least passing through the wall of the annular guide to the duct opening;

(e) passing the at least one inner tube through the outer tube extruder bore and the annular guide;

(f) passing the at least one inner tube through the sizing device bore;

(g) forcing a melt pool between the die body and the mandrel to create a ribless outer tube at the same rate of speed as the at least one inner tube is moving, which outer tube surrounds the annular guide;

(h) pulling the outer tube through the sizing device bore to shape and size the outer tube; and (i) simultaneously with steps (g) and (h), applying a cooling agent through the duct opening to the outer tube.

11. The method of claim 10, wherein the free space is between approximately one half and two times the volume occupied by the at least one inner tube.

12. The method of claim 10, in which the nested tubing is made from a thermoplastic resin.

\* \* \* \* \*